(12) United States Patent
  Cobb

(10) Patent No.: US 9,292,698 B1
(45) Date of Patent: Mar. 22, 2016

(54) METHOD AND SYSTEM FOR REMOTE FORENSIC DATA COLLECTION

(71) Applicant: Andrew T. Cobb, Louisville, KY (US)

(72) Inventor: Andrew T. Cobb, Louisville, KY (US)

( * ) Notice: Subject to any disclaimer, the term of this patent is extended or adjusted under 35 U.S.C. 154(b) by 187 days.

(21) Appl. No.: 14/158,482

(22) Filed: Jan. 17, 2014

Related U.S. Application Data

(60) Provisional application No. 61/754,345, filed on Jan. 18, 2013.

(51) Int. Cl.
  *G06F 21/60* (2013.01)
  *G06F 21/62* (2013.01)

(52) U.S. Cl.
  CPC .......... *G06F 21/602* (2013.01); *G06F 21/6209* (2013.01)

(58) Field of Classification Search
  None
  See application file for complete search history.

(56) References Cited

U.S. PATENT DOCUMENTS

| | | |
|---|---|---|
| 2008/0244034 A1 | 10/2008 | Shannon et al. |
| 2009/0287910 A1 | 11/2009 | Wilson |
| 2010/0241977 A1 | 9/2010 | Greetham |
| 2012/0246185 A1* | 9/2012 | Morimoto ............ G06Q 10/103 707/758 |

* cited by examiner

*Primary Examiner* — Minh Dinh
(74) *Attorney, Agent, or Firm* — Stites & Harbison, PLLC; Jeffrey A. Haeberlin; Terry L. Wright

(57) ABSTRACT

A system and method for forensic data collection includes: creating, by a configuration computer, an encrypted configuration file for collecting files from a data source; saving, by the configuration computer, the encrypted configuration file to a non-password-encrypted configuration file storage device; loading, by a data collection computer, the encrypted configuration file from a non-password-encrypted external storage device; collecting, by the data collection computer, the files from the data source based on the encrypted configuration file.

14 Claims, 6 Drawing Sheets

METHOD AND SYSTEM FOR REMOTE FORENSIC DATA COLLECTION

CROSS-REFERENCE TO RELATED APPLICATIONS

This application claims the benefit of U.S. Provisional Application No. 61/754,345, filed Jan. 18, 2013, the entire disclosure of which is hereby incorporated by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of data copying. More particularly, the present invention is in the technical field of data preservation and collection for litigation, investigations, intelligence or other scenarios requiring the preservation or forensic collection of data.

2. Description of Related Art

Forensic data collection is often performed for legal matters in order to preserve and/or analyze data that may be used during criminal or civil litigation. The process of forensic data collection is different from a normal file copy process in that with forensic copying, the version of data that is copied is a mirror image of the original data being copied.

Forensic data collection normally requires that a forensic technician conduct the data collection directly from a user's computer on-site. Forensic technicians use special software that copies the source data exactly, so that the copy is an exact representation of the original data set. Forensic technicians also use a verification method, such as a digital hash, so the data collection can be verified by a third party in case a question arises as to the authenticity of the data during or after analysis. Having a forensic technician perform the copy, however, can be a costly proposition, especially if a legal matter or investigation involves multiple users' computers in multiple locations.

If a forensic technician is not hired to perform the collection, because of cost or other reasons, the user may be asked to make a "normal" copy of their data. This, however, may create problems since the user may, advertently or inadvertently, not copy the correct information from their computer. In addition, since a user is not a forensic technician, they would not normally use forensic copying software for making copies of data. Therefore, the version of the data copied will not exactly match the original data.

BRIEF SUMMARY OF THE INVENTION

The present invention sets forth a method by which an investigator sets up the parameters of the data collection, while allowing the user of the computer to actually trigger the data collection. The invention outlines controls so that (a) tampering with the data collection parameters set by the investigator is prevented and (b) attempts to tamper with the output of the data collection is detected. The invention blends the convenience and cost-savings of having the user trigger the data collection, while the investigator maintains the control over the data collection. The invention also incorporates software that does not require special hardware, but rather can be run on any NTFS-formatted storage device without requiring installation.

The present invention is a remote data preservation and collection method that (a) allows an investigator to configure the parameters of the data to be collected from a user and (b) allows the user to trigger the data collection. The invention prevents tampering of the configuration of the data to be copied and detects attempts to tamper with the data collected by the user.

DETAILED DESCRIPTION OF EXEMPLARY EMBODIMENTS OF THE INVENTION

Figure 1:
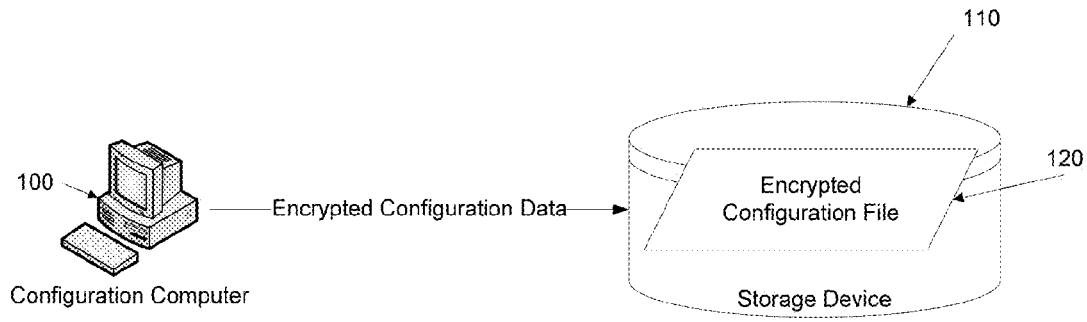
FIG. 1 is a block diagram showing components of an exemplary configuration file creation process according to the invention.

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

While the following terms are believed to be well understood by one of ordinary skill in the art, definitions are set forth to facilitate explanation of the presently-disclosed subject matter.

Unless defined otherwise, all technical and scientific terms used herein have the same meaning as commonly understood by one of ordinary skill in the art to which the presently-disclosed subject matter belongs. Although any methods, devices, and materials similar or equivalent to those described herein can be used in the practice or testing of the presently-disclosed subject matter, representative methods, devices, and materials are now described.

Following long-standing patent law convention, the terms "a", "an", and "the" refer to "one or more" when used in this application, including the claims. Thus, for example, reference to "a device" includes a plurality of such devices, and so forth.

Unless otherwise indicated, all numbers expressing quantities, properties, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

The term "computer" is used herein to describe a processing device including, generally: a data storage device; an input/output device(s) through which data may be entered into the computer, received from the computer, or both; and a processor for executing instructions stored on the data storage device.

The term "data storage device" is understood to mean physical devices (computer readable media) used to store programs (sequences of instructions) or data (e.g. program state information) on a non-transient basis for use in a computer or other digital electronic device, including primary memory used for the information in physical systems which are fast (i.e. RAM), and secondary memory, which are physical devices for program and data storage which are slow to access but offer higher memory capacity. Traditional secondary memory includes tape, magnetic disks and optical discs (CD-ROM and DVD-ROM). As used herein, "data storage device" also includes networked storage devices, including "cloud storage devices" accessible over the Internet which can span across multiple devices and multiple locations.

The term "memory" is often (but not always) associated with addressable semiconductor memory, i.e. integrated circuits consisting of silicon-based transistors, used for example as primary memory but also other purposes in computers and other digital electronic devices. Semiconductor memory includes both volatile and non-volatile memory. Examples of non-volatile memory include flash memory (sometimes used as secondary, sometimes primary computer memory) and ROM/PROM/EPROM/EEPROM memory. Examples of volatile memory include dynamic RAM memory, DRAM, and static RAM memory, SRAM.

The term "processor" is understood to include one or more microprocessors, microcontrollers, central processing units, Digital Signal Processors (DSPs), Field-Programmable Gate Arrays (FPGAs), Application-Specific Integrated Circuits (ASICs), or the like.

The term "hash function" means an algorithm that takes an arbitrary block of data and returns a fixed-size bit string, the cryptographic hash value, or simply "hash", such that any (accidental or intentional) change to the data will, with very high probability, change the hash value. Examples of hash functions are MD5, SHA-1 and SHA-256.

The term "symmetric encryption method" means an encryption method whose cryptographic key is used for both the encryption and decryption of data.

In collecting data for discovery in legal matters, investigations or intelligence-gathering, it is important to maintain the integrity of not only the contents of data files, but also information about the files, such as file creation time, which is called file metadata. When users, who are often called data custodians in legal matters, make a "normal" copy of data using techniques at their disposal, file metadata is not preserved. Losing this integrity can prove problematic when the data files are presented during legal discovery, for example. Incorrect file metadata can lead opposing counsel to question the validity of the data. Investigations or intelligence operations involving the copied data may rest wholly on the time stamps of the copied files.

Another problem with users copying the data is that the user may, advertently or inadvertently, copy incorrect data. Courts have been known to sanction participants for not preserving, collecting or producing data relevant to the legal matter at hand.

To address these problems, computer forensic technicians are often asked to perform the copying process. Acting as agents of legal counsel, these technicians use tools and techniques that maintain the integrity of the data, thus mitigating challenges related to the data. However, computer forensic technicians can be expensive, as can be travel to various locations to perform the copying process.

The current invention addresses the defensibility and cost issues related to data collection by allowing the representative of an organization to control what is collected, but allowing the user to trigger the collection. For example, having legal counsel control what is collected, while preventing tampering by the data custodian, increases the defensibility of the data collected. Having the data custodian trigger the data collection lowers the cost since a computer forensic technician is no longer needed. Since legal counsel creates the encrypted configuration file which is used by the data custodian to trigger the data collection, the current invention creates a defensible data collection at a lower cost than when using a computer forensic technician.

Unlike prior inventions, the current invention does not require a special hardware device. Any storage device may be used to collect data after it is properly configured. Allowing any storage device to be configured lowers the cost of the data collection process and provides more flexibility. In prior inventions that use a special hardware device, if the device is being used in one location, a second device would have to be obtained to collect data in a second location. Since the current invention does not require special hardware, several standard storage devices can be configured and used for data collection at multiple locations.

An important concept for the current invention is the use of encrypted configuration data that controls what data is collected. While the software must have access to the configuration data in order to interpret the configuration parameters to execute the data collection, the configuration file can be located locally or remotely. Unlike prior art, this loose coupling of the configuration data from the data storage device allows for much more flexible data collection scenarios. For example, one configuration file can be share for multiple data collections, as long as the data collection parameters are the same. In addition to the current embodiment, another embodiment of the current invention allows multiple data collections to refer to a single configuration file at a centralized location via a remote network connection.

Configuration File Creation Process

FIG. 1 is a block diagram showing components for executing an exemplary configuration file creation process, including a configuration computer 100 and a non-password-encrypted configuration file storage device 110 ("configuration file storage device 110"). Advantageously, because of the encryption and verification techniques employed in the present invention, it is unnecessary to utilize a password-encrypted storage device to store an encrypted configuration file 120, as described below. The configuration computer 100 preferably uses an Intel-based processor and runs a Microsoft Windows 32-bit or 64-bit operating system. The configuration computer 100 creates the encrypted configuration file 120 for collecting data from a data source 220 (FIG. 4) based on parameters set by an operator, as described below, and saves the encrypted configuration file 120 to the configuration file storage device 110.

Figure 2:
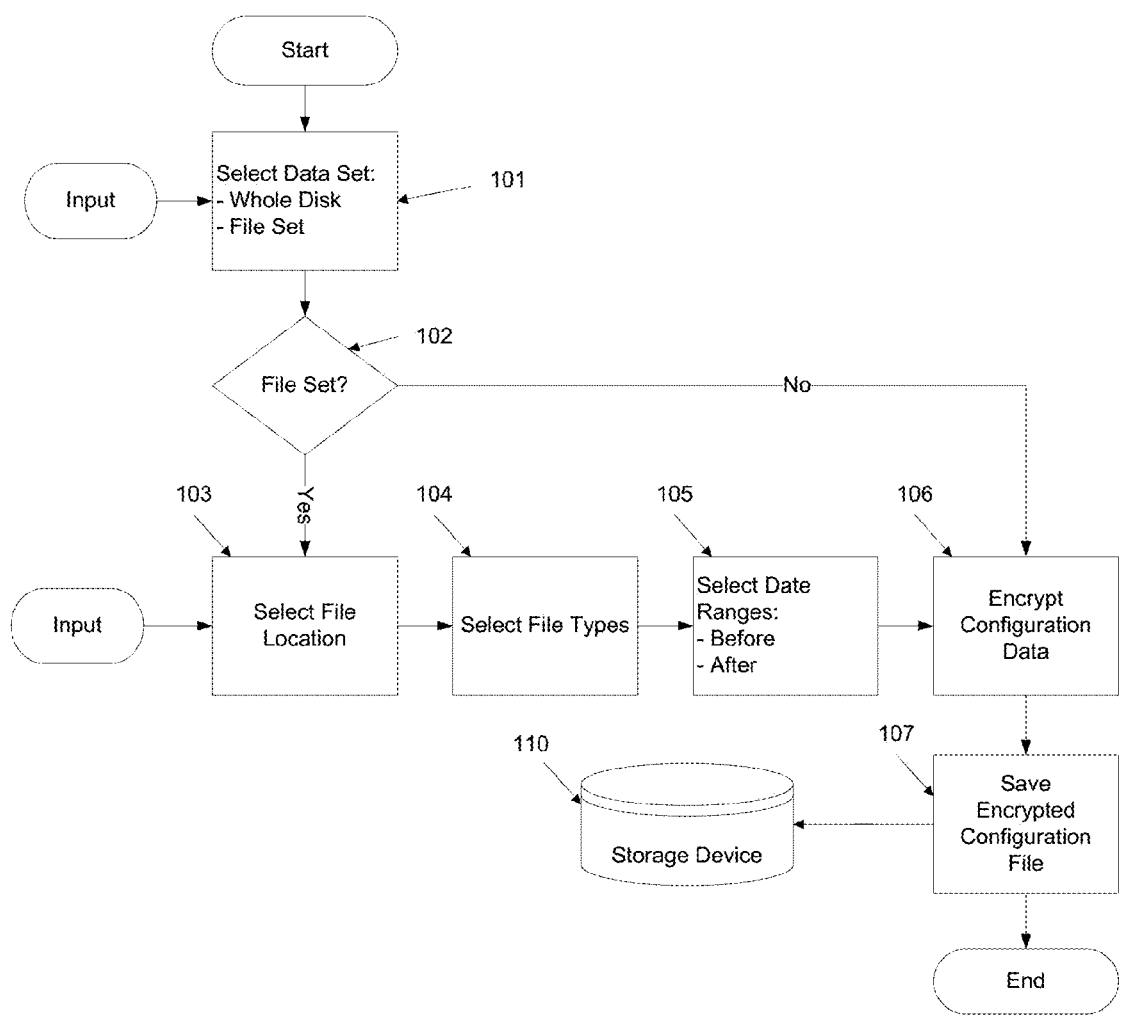
FIG. 2 is a flow chart showing steps of the exemplary configuration file creation process.

FIG. 2 is a flow chart showing steps of the exemplary configuration file creation process.

In a first step 101, receiving selection of data set, the configuration computer 100 receives, via an input/output device, an input from the operator of either a "file set" or a "whole disk" to be copied.

In response to receiving a "whole disk" copy input, the configuration computer 100, in a second step 102, directs control of the configuration file creation process to step 106, encrypting configuration data, which is discussed in more detail below. However, in response to receiving a "file set" copy input, the configuration computer 100, in the second step 102, directs control of the configuration file creation process to step 103, receiving selection of file location.

Figure 4:
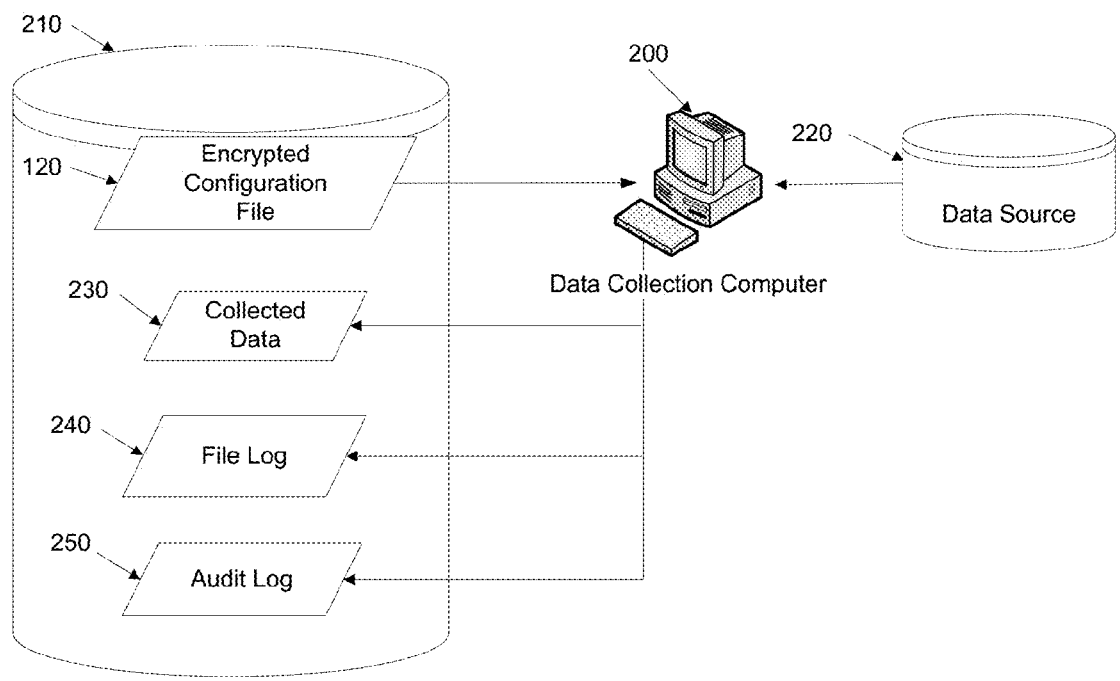
FIG. 4 is a block diagram showing components of an exemplary data collection process according to the invention.

In step 103, receiving selection of file location, an input is received from the operator of a folder or a list of folders on the data source 220 (FIG. 4) that are to be copied. The folder or list of folders to be copied is either input by the operator, or selected by the operator from a list which has previously been made available to the configuration computer 100. If the operator wishes to select from the list, the configuration computer 100 displays a screen showing the list of all folders on the data source 220 (FIG. 4). The operator then selects one or more folders from this list. From step 103, the configuration computer 100 directs control of the configuration file creation process to step 104, receiving a selection of file types.

In step 104, receiving a selection of file types, the configuration computer 100 receives an input from the operator of file types to be included in the data to be copied. The file types can be pre-defined sets of file types, such as business documents or emails, or custom file types can be chosen by file extension. In one embodiment of the invention, the configuration computer 100 supplies four (4) categories of file types, although a person skilled in the art will recognize that the actual number of categories of file types is not a limitation on instant invention, which may contain many others. Nevertheless, the four categories of the one embodiment are: (1) Business document file types, which include Microsoft Office documents and portable document format (PDF) documents and many others, (2) Email file types, (3) Picture and Video file types, and (4) Other file types, which allows the operator to add custom file types to be copied. Additionally, in another exemplary embodiment, the configuration computer 100 receives an input from the operator of file types to be excluded from the data to be copied. Examples of file types to be excluded from copying are system files or other files that are not of interest. From step 104, the configuration computer 100 directs control of the configuration file creation process to step 105, receiving a selection of date ranges.

In step 105, receiving a selection of date ranges, the configuration computer 100 receives a selection of before and after dates of creation or modification dates from the operator. From step 105, the configuration computer 100 directs control of the configuration file creation process to step 106, encrypting configuration data.

In step 106, encrypting configuration data, the configuration computer 100 compiles the configuration parameters, which are either data for copying an entirety of the data source 220 or data for copying the selection of at least one folder, file types (if selected), and date ranges of files (if selected) of the data source 220. The configuration computer 100 compiles the configuration parameters into an encrypted configuration file 120.

Figure 3:
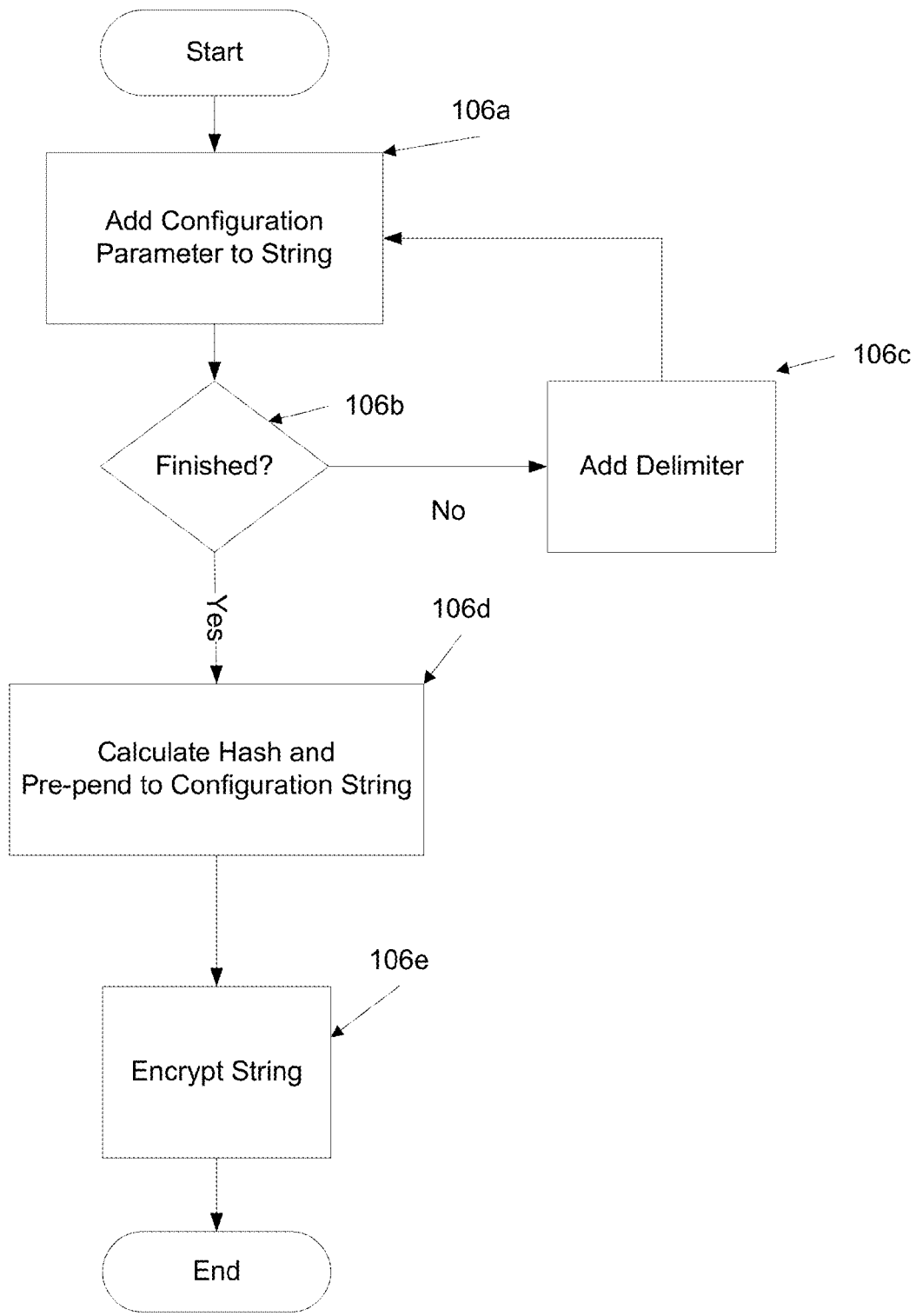
FIG. 3 is a flow chart showing steps in the configuration file encryption process.

FIG. 3 shows how the configuration computer 100 compiles the encrypted configuration file 120. In step 106*a*, the configuration computer 100 appends the configuration parameters together to form a configuration string. In step 106*b*, the configuration computer 100 performs a check to determine if all the configuration parameters are loaded into the configuration string based on the operator's earlier selections. As long as parameters still need to be loaded into the configuration string, the configuration computer 100 repeats steps 106*a* and 106*c*. When no parameters need to be added, in step 106*d*, the configuration computer 100 calculates a hash of the configuration string and pre-p ends the hash to the configuration string. Finally, in step 106*e*, the configuration computer 100 encrypts the configuration string using a character-string symmetrical encryption method with an internal encryption/decryption key, and stores the encrypted configuration string as the encrypted configuration file 120.

Returning now to FIG. 2, from step 106, the configuration computer 100 directs control of the configuration file creation process to step 107, saving the encrypted configuration file 120. In step 107, saving the encrypted configuration file, the configuration computer 100 saves the encrypted configuration file 120 to the configuration file storage device 110 (see also FIG. 1).

Data Collection Process

FIG. 4 is a block diagram showing components for executing an exemplary data collection process, including a data collection computer 200, a non-password-encrypted external data storage device 210 ("external storage device 210"), and the data source 220. Advantageously, again, because of the encryption and verification techniques employed in the present invention, it is unnecessary to utilize a password-encrypted storage device for storage of files, data, and logs, as described below. The data collection computer 200 preferably uses an Intel-based processor and runs a Microsoft Windows 32-bit or 64-bit operating system. The encrypted configuration file 120 is stored on the external data storage device 210, which may or may not be the same as the configuration file storage device 110. The external data storage device 210 is preferably a NTFS-formatted external storage device connected to the data collection computer 200 via a USB, eSATA, or other high-speed data connection. However, other embodiments use data storage available through a network connection. For example, one embodiment of the current invention allows a user to receive an email with an embedded link. When the link is selected, software is downloaded and executed on the user's computer that uploads relevant information to an ftp (file transfer protocol) site or other internet storage location, such as a web folder. Another embodiment allows a network administrator to retrieve data from computers connected remotely via a network.

Figure 5:
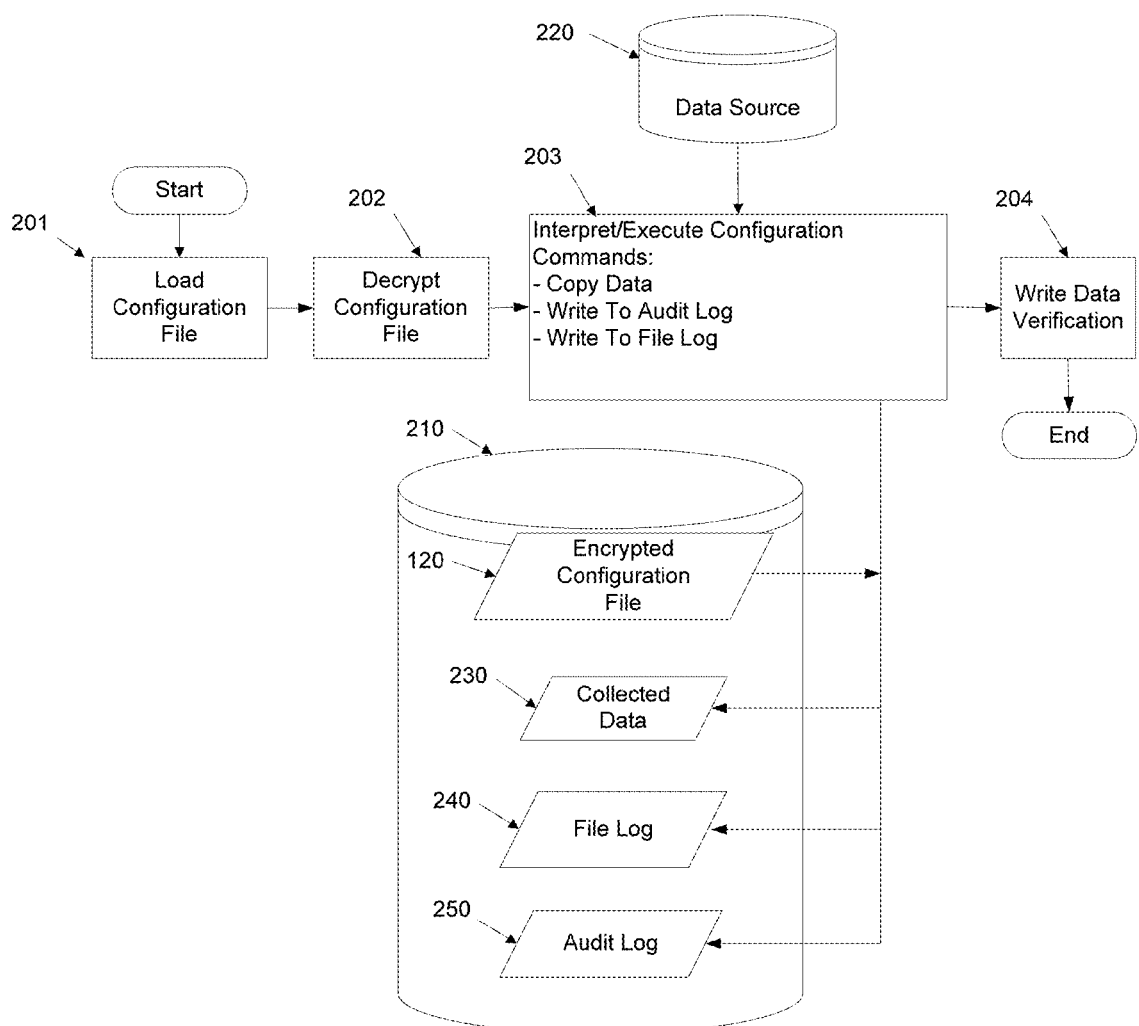
FIG. 5 is a flow chart showing steps of the exemplary data collection process.

FIG. 5 is a flow chart showing steps of the exemplary data collection process. Initially, the data collection computer 200 prompts an operator to start the data collection process. During the data collection process, the data collection computer 200 displays a status of the progress of the data collection. At the end of the data collection process, the data collection computer 200 notifies the operator that the data collection process has finished.

In a first step 201, loading configuration file, the data collection computer 200 loads the encrypted configuration file 120 from the external data storage device 210. From step 201, the data collection computer 200 directs control of the data collection process to step 202, decrypting configuration file.

In step 202, decrypting configuration file, the data collection computer 200 decrypts data from the encrypted configuration file 120 to the configuration data using the same symmetric encryption method and internal key as in step 106.

Figure 6:
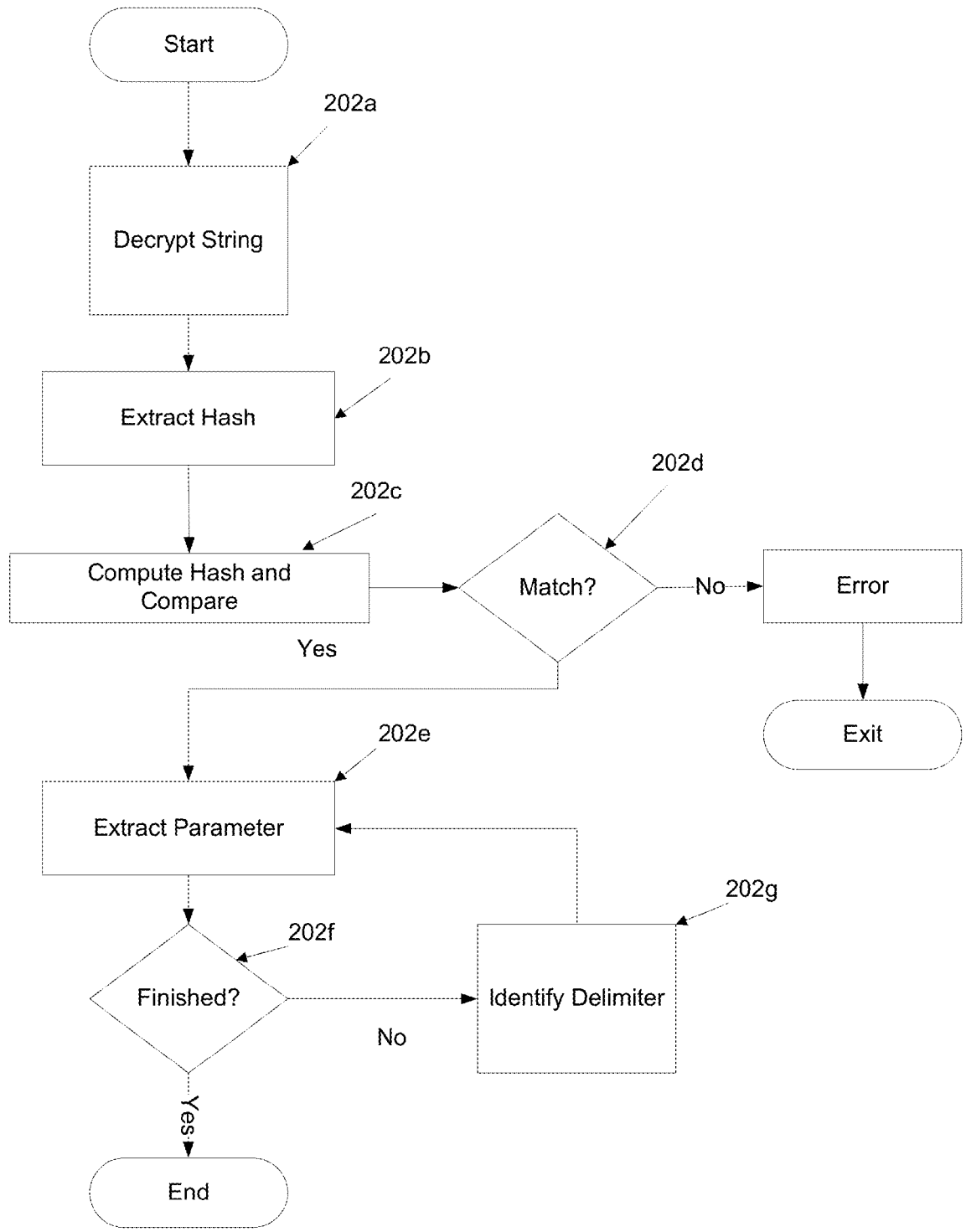
FIG. 6 is a flow chart showing steps in the configuration file decryption process.

FIG. 6 shows the details of the configuration file decryption steps. In step 202*a*, the configuration string is decrypted from the encrypted configuration file. The data collection computer 200 extracts the first parameter, the hash of the configuration string as an extracted hash value, in step 202*b*. As a security measure, to ensure the configuration has not been tampered with, the data collection computer 200 computes the hash of the configuration string in step 202c, and compares it to the hash extracted in the previous step, step 202b. If the hashes do not match, execution stops and the data collection computer 200 alerts the operator that an error has occurred. If the hashes match, the data collection computer 200 directs control to step 202e. In step 202e, the data collection computer 200 extracts each parameter. In 202g, the data collection computer 200 identifies the delimiter. The data collection computer 200 repeats steps 202e and 202g until no more parameters are present.

Returning to FIG. 5, from step 202, the data collection computer 200 directs control of the data collection process to step 203, interpreting and executing configuration data from the decrypted configuration file. In step 203, interpreting and executing configuration parameters extracted from the decrypted configuration file, the data collection computer 200 interprets and executes the data collection using the parameters extracted in step 202. The configuration parameters instruct the data collection computer 200 what files to copy from the data source 220, as determined in the configuration file creation process described in the configuration file creation process. The data collection computer 200 creates on the external data storage device 210 the collected data 230 containing data collected from the data source 220. The data collection computer 200 encrypts the collected data 230 on the external data storage device 210 using either standard NTFS EFS encryption or another standard encryption method with at least 128-bit strength.

In addition to the collected data 230, the data collection computer 200 creates and stores on the external data storage device 210 either one or two log files, depending on the settings in the encrypted configuration file 120.

If during the configuration file creation process the configuration computer 100 (FIG. 1) received an input of a "file set" to be copied, the data collection computer 200 creates a file log 240 that contains information about each file copied. The file log 240 contains the following pieces of information about each copied file:
   Date/Time When the File Was Copied
   Path/Filename of the Copied File
   Creation Date of the Copied File
   Modified Date of the Copied File
   Accessed Date of the Copied File
   Hash of the Copied File If during the configuration file creation process the configuration computer 100 (FIG. 1) received an input of the "whole disk" to be copied, the collected data file 230 will be a disk image of the data source 220.

Throughout the copying process, the data collection computer 200 writes to the audit log 250 information about the user, the data collection system, the connected storage devices, and the copying process, including errors or warnings encountered. Some examples of this information are: the username of the currently logged in Windows user, the model number and serial number of the main hard drive and errors or warnings encountered while trying to copy files, such as errors copying protected system files. As with the collected data file 230 and the file log 240, the data collection computer 200 creates the audit log 250 on the external data storage device 210.

From step 203, the data collection computer 200 directs control of the data collection process to step 204, writing of the verification data. In this step the data collection computer 200 writes two possible verifications. If a "file set" was selected for copy during the configuration file creation process, the data collection computer calculates and writes an encrypted hash of file log 240 to the audit log 250. If the "whole disk" is selected for copy during the configuration file creation process, an encrypted hash of the whole disk (i.e., the data source 220 (as opposed to the encrypted collected data 230)) is calculated and saved to the audit log 250. The encryption of the hash of the file log 240 or the hash of the whole disk (i.e., the data source 220) is, again, performed using either standard NTFS EFS encryption or another standard encryption method with at least 128-bit strength.

Data Verification Process

Figure 7:
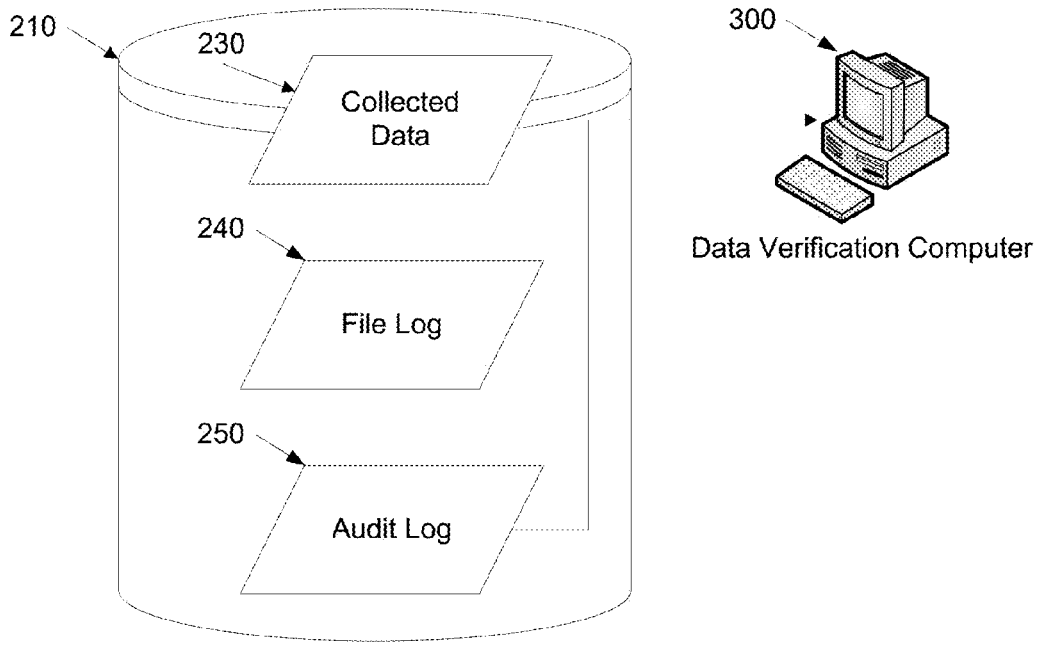
FIG. 7 is a block diagram showing components of an exemplary data verification process according to the invention.

FIG. 7 is a block diagram showing components for executing an exemplary data verification process, including the external data storage device 210 and a data verification computer 300. The data verification computer 300 preferably uses an Intel-based processor and runs a Microsoft Windows 32-bit or 64-bit operating system. The external data storage device 210, as discussed above, contains the collected data file 230, the audit log 250, and, optionally, the file log 240 created during the data collection process described above.

Figure 8:
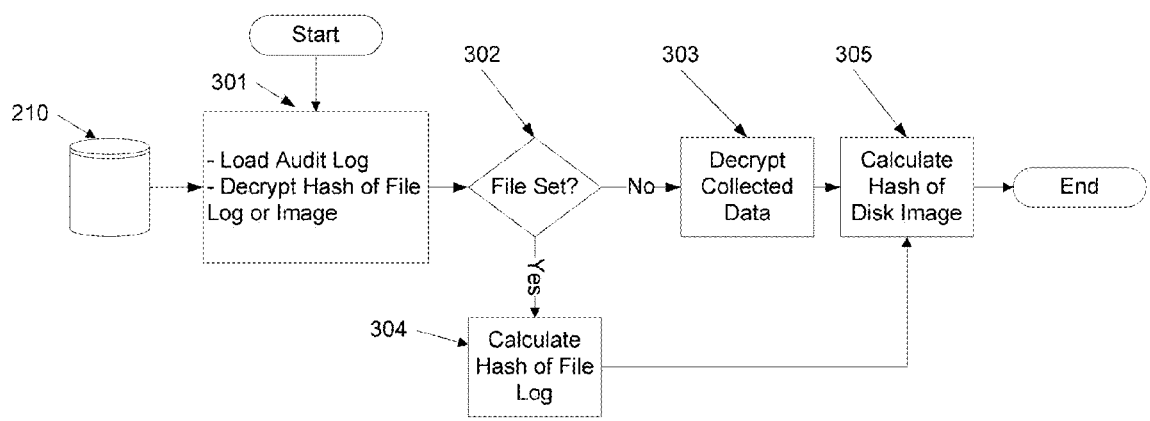
FIG. 8 is a flow chart showing steps of the exemplary data verification process.

FIG. 8 is a flow chart showing steps of the exemplary data verification process.

In step 301, the data verification computer 300 loads the audit log 250 and decrypts the verification data, which is either the encrypted hash of the file log 240 or the encrypted hash of the whole disk. The data verification computer utilizes any standard decryption method required for the encryption method that was used to encrypt the verification data, such as standard NTFS EFS encryption or another standard encryption method with at least 128-bit strength.

If the data collected was a "file set," then the data verification computer 300, in step 304, calculate hash of file log, reads and calculates a hash of the file log 240. The data verification computer 300, or an operator, then compares the resulting hash with the decrypted hash from the audit log 250. If these do not match, this means that the file log 240 was changed after the data collection process and is, therefore, not verifiable. However, if both hashes match, then the data of the file log is verified.

If the data collected was the "whole disk," the data verification computer 300, in step 303, decrypt collected data, loads and decrypts the collected data 230 (i.e., the disk image of the data source 220, or the "whole disk"). Incidentally, step 303, decrypt collected data, is not required to be done in any particular sequence with respect to the other steps of the exemplary data verification process other than it must be performed prior to step 305, calculate a hash of disk image, because step 305 must be performed on a decrypted copy of the disk image. The data verification computer 300 decrypts the collected data file 230 using whatever standard decryption method is required for the encryption method used.

In step 305, calculate hash of disk image, the data verification computer 300 calculates a hash of the collected data file 230 (i.e., the disk image). The data verification computer 300, or an operator, then compares the resulting hash with the decrypted hash from the audit log 250. If the hashes do not match, this means that the collected data file 230 (i.e., the disk image) was changed after the data collection process and is, therefore, not verifiable. However, if both hashes match, then the data of the collected data file 230 is verified.

After the verification process is complete, the operator can be ensured that the data that has been remotely collected with the current invention is precisely the data the operator creating the configuration intended to collect.

The current invention provides a method of secure, tamper-resistant remote data collection for legal matters using unique processes not disclosed in prior inventions. The current invention is designed to allow secure data collection without special hardware and without the presence of a specially trained technician, thus lowering the overall costs for data collection. Prior inventions require a special hardware device or required a constant remote connection to the data source. The current invention can utilize any properly configured storage device and only requires a local connection to the data source.

What is claimed is:

1. A method for forensic data collection, comprising:
creating, by a configuration computer, an encrypted configuration file for collecting files from a data source, including:
  prompting an operator, via an input/output device of the configuration computer, to select either a "file set" or a "whole disk" of files of the data source to be collected;
  in response to receiving a selection of the "whole disk" of files of the data source to be copied, then compiling configuration parameters including data for copying an entirety of the data source as the encrypted configuration file; and
  in response to receiving a selection of the "file set" of files of the data source to be copied, then:
    prompting the operator to select and receiving a selection from the operator of at least one folder to be copied from the data source;
    prompting the operator to select and receiving a selection from the operator of at least one file type to be copied from the data source;
    prompting the operator to select and receiving an selection from the operator of date ranges of files to be copied from the data source; and
    compiling configuration parameters including data for copying the selection of at least one folder, at least one file type, and data ranges of files to be copied from the data source as the encrypted configuration file;
  wherein compiling configuration parameters includes:
    appending the configuration parameters together to form a configuration string;
    calculating a hash of the configuration string and prepending the hash to the configuration string; and
    encrypting the configuration string as the encrypted configuration file;
saving, by the configuration computer, the encrypted configuration file to a non-password-encrypted configuration file storage device;
loading, by a data collection computer, the encrypted configuration file from a non-password-encrypted external storage device; and
collecting, by the data collection computer, the files from the data source based on the encrypted configuration file.

2. The method of claim 1, wherein encrypting the configuration string includes using a character-string symmetrical encryption method with an internal encryption/decryption key.

3. The method of claim 1, wherein collecting data from the data source further includes:
decrypting the configuration parameters from the encrypted configuration file;
interpreting the configuration parameters to identify files of the data source to be collected;
copying, encrypting, and storing the files of the data source to the non-password-encrypted external storage device as a collected data file; and
writing an audit log to the external storage device, the audit log including information about a user, the data collection computer, any connected storage devices, and any errors or warnings encountered during the copying, encrypting, and storing of the files as the collected data file.

4. The method of claim 3, wherein decrypting the configuration parameters includes:
decrypting the configuration string from the encrypted configuration file;
extracting the hash from the configuration string as an extracted hash value;
computing a computed hash value of the configuration string and comparing the computed hash value to the extracted hash value to validate the configuration string; and
extracting the configuration parameters from the configuration string.

5. The method of claim 3, further comprising:
if "file set" was selected during creating the encrypted configuration file, creating a file log that contains information about each file copied, encrypted, and stored as the collected data file, the information including:
  a date and time when each file was copied;
  a path and filename of each file;
  a creation date of each file;
  a modification date of each file;
  an accessed date of each file; and
  a hash of each file.

6. The method of claim 5, further comprising writing encrypted verification data to the audit log, wherein:
if "file set" was selected during creating the encrypted configuration file, the verification data is an encrypted hash of the file log; and
if "whole disk" was selected during creating the encrypted configuration file, the verification data is an encrypted hash of the whole disk.

7. The method of claim 6, further comprising verifying the files collected from the data source, including:
loading, by a data verification computer, the audit log and decrypting the verification data;
if "file set" was selected during creating the encrypted configuration file, then calculating a hash of the file log for comparison with the verification data;
if "whole disk" was selected during creating the encrypted configuration file, then decrypting the collected data file and calculating a hash of the decrypted collected data file for comparison with the verification data.

8. A system for forensic data collection, comprising:
a configuration computer for:
  creating an encrypted configuration file for collecting files from a data source; including:
    prompting an operator, via an input/output device of the configuration computer, to select either a "file set" or a "whole disk" of files of the data source to be collected;
    in response to receiving a selection of the "whole disk" of files of the data source to be copied, then compiling configuration parameters including data for copying an entirety of the data source as the encrypted configuration file; and
    in response to receiving a selection of the "file set" of files of the data source to be copied, then:
      prompting the operator to select and receiving a selection from the operator of at least one folder to be copied from the data source;
      prompting the operator to select and receiving a selection from the operator of at least one file type to be copied from the data source;

prompting the operator to select and receiving an selection from the operator of date ranges of files to be copied from the data source; and compiling configuration parameters including data for copying the selection of at least one folder, at least one file type, and data ranges of files to be copied from the data source as the encrypted configuration file; and saving the encrypted configuration file to a non-password-encrypted configuration file storage device; and a data collection computer for:

loading the encrypted configuration file from a non-password-encrypted external storage device; and collecting the files from the data source based on the encrypted configuration file;

wherein the configuration computer, when compiling configuration parameters, is further for:

appending the configuration parameters together to form a configuration string;

calculating a hash of the configuration string and prepending the hash to the configuration string; and encrypting the configuration string as the encrypted configuration file.

9. The system of claim 8, wherein the configuration computer, when encrypting the configuration string, is further for using a character-string symmetrical encryption method with an internal encryption/decryption key.

10. The system of claim 8, wherein the data collection computer is further for:

decrypting the configuration parameters from the encrypted configuration file;

interpreting the configuration parameters to identify files of the data source to be collected;

copying, encrypting, and storing the files of the data source to the non-password-encrypted external storage device as a collected data file; and writing an audit log to the external storage device, the audit log including information about a user, the data collection computer, any connected storage devices, and any errors or warnings encountered during the copying, encrypting, and storing of the files as the collected data file.

11. The system of claim 10, wherein the data collection computer, when decrypting the configuration parameters is further for:

decrypting the configuration string from the encrypted configuration file;

extracting the hash from the configuration string as an extracted hash value;

computing a computed hash value of the configuration string and comparing the computed hash value to the extracted hash value to validate the configuration string; and extracting the configuration parameters from the configuration string.

12. The system of claim 10, wherein the data collection computer is further for:

if "file set" was selected during creating the encrypted configuration file, creating a file log that contains information about each file copied, encrypted, and stored as the collected data file, the information including:

a date and time when each file was copied;

a path and filename of each file;

a creation date of each file;

a modification date of each file;

an accessed date of each file; and a hash of each file.

13. The system of claim 12, wherein the data collection computer is further for writing verification data to the audit log, wherein:

if "file set" was selected during creating the encrypted configuration file, the verification data is the hash of the file log; and if "whole disk" was selected during creating the encrypted configuration file, the verification data is the hash of the whole disk.

14. The system of claim 13, further comprising a data verification computer for:

loading the audit log and decrypting the verification data;

if "file set" was selected during creating the encrypted configuration file, then calculating a hash of the file log for comparison with the verification data;

if "whole disk" was selected during creating the encrypted configuration file, then decrypting the collected data file and calculating a hash of the collected data file for comparison with the verification data.

* * * * *